July 2, 1940.  P. E. JOLLY  2,206,095
MECHANICAL DISPLAY DEVICE
Filed Dec. 21, 1939
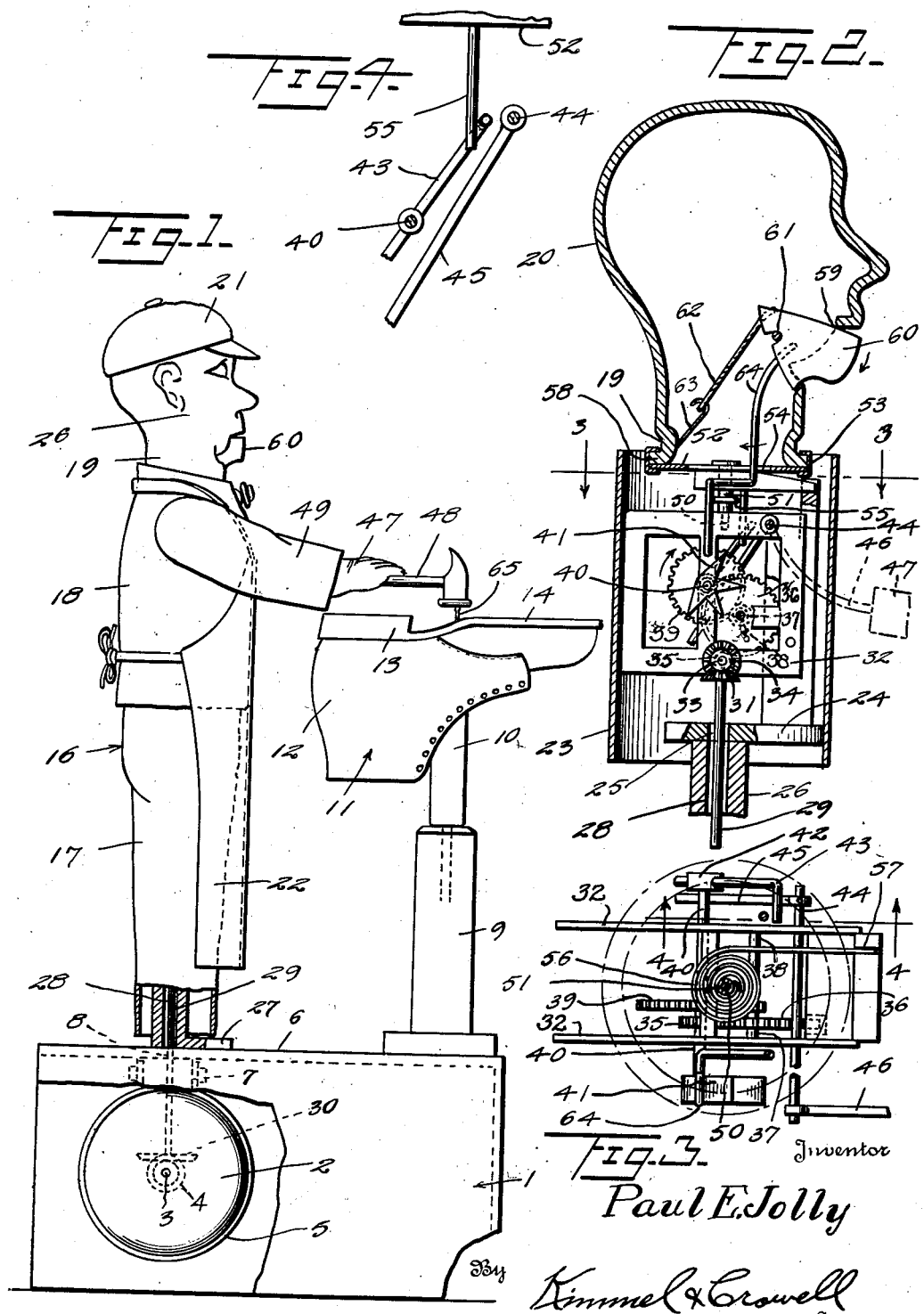
Inventor
Paul E. Jolly
By Kimmel & Crowell
Attorneys Patented July 2, 1940

2,206,095

UNITED STATES PATENT OFFICE 2,206,095

MECHANICAL DISPLAY DEVICE

Paul E. Jolly, Cave City, Ky.

Application December 21, 1939, Serial No. 310,457

8 Claims. (Cl. 46—119)

This invention relates to a mechanical display device.

The invention aims to provide, in a manner as hereinafter set forth, a display device of the class referred to for simulating the appearance of a shoemaker repairing a shoe.

The invention further aims to provide, in a manner as hereinafter set forth, a mechanical display device including the simulation of a shoemaker's stand, the simulation of a shoemaker's last mounted in the simulation of the stand, a simulation of an inverted shoe mounted on the simulation of the last, and the simulation of a shoemaker repairing the simulation of the shoe.

The invention further aims to provide, in a manner as hereinafter set forth, a mechanical display device simulating the appearance of a shoe maker repairing a shoe and with the simulation including a movable head part, a movable neck part, a movable lower jaw part and a movable arm part, and with such parts movable in unison.

The invention further aims to provide, in a manner as hereinafter set forth, a mechanical display device in the form of a shoemaker repairing a shoe, which is comparatively simple in its construction and arrangement, strong, durable, compact, distinctive and attractive, readily assembled, comparatively inexpensive, and thoroughly efficient for the purpose intended thereby.

Embodying the aims aforesaid, and others which may hereinafter appear, the invention consists of the novel construction, combination and arrangement of parts, as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a side elevation, partly in section of a mechanical display device, in accordance with this invention, Figure 2 is a fragmentary view, in section upon an enlarged scale.

Figure 3 is a sectional plan taken on the line 3—3 of Fig. 2, and

Figure 4 is a sectional detail taken on the line 4—4 of Fig. 3.

The device includes a hollow rectangular base 1 in which is arranged an electric motor 2 having its shaft 3 extended therefrom and provided with a bevel gear 4. The motor 2 is mounted in a suspension 5 secured to the lower face of the top wall 6 of the base, as indicated at 7. The power circuit conductors for the motor are not shown, but it is to be understood that any suitable form of circuit conductors leading from an electrical output or source, not shown, may be employed. The motor 2 is arranged in the base 1 between the transverse median of the latter and its rear end. The wall 6 is formed with an opening 8 for a purpose to be referred to.

Secured upon the wall 6, in proximity to the front of base 1 is a vertically disposed element 9 simulating a shoemaker's stand. Mounted in the upper end of the element 9 is a vertically disposed member 10 simulating a shoemaker's last. Positioned on the upper end of the member 10 is an inverted element 11 in the form of a shoe having its upper, heel, and sole designated 12, 13, and 14 respectively. The element 11 extends forwardly and rearwardly with respect to the member 10.

Mounted on the wall 6 rearwardly of and spaced from the elements 9, 11 and member 10 is an upstanding structure 16 simulating the appearance of a shoemaker in the act of repairing the shoe simulated by the element 11. The structure 16 includes parts 17 and 18 simulating respectively, the trousers and coat of a shoemaker. The structure 16 includes hollow integral superimposed parts 19, 20 simulating respectively the neck and head of a shoemaker. Mounted on the part 20 is the simulation of a cap 21. Arranged at the front of and connected to the structure 16 is the simulation of an apron 22.

The structure 16 includes a rigid cylinder 23, which is enclosed by the part 18. Fixed within the lower portion of cylinder 23 is a flat support 24 formed with an opening 25. Secured at its upper end to the support 24 is a standard 26 which, at its lower end is secured to the wall 6 of the base 1. The lower end of standard 26 is formed with a foot piece 27, which also is secured to base wall 6. The foot piece 27 is arranged below the part 17. The standard 26 throughout thereof is formed with an opening 28, which registers with the openings 8 and 25. The standard 26 is arranged within one of the legs of the trousers provided by the part 17.

Extending down through the openings 25, 28 and 8 is the operating shaft 29 of the device. The shaft depends into the base 1 and has its lower end formed with a bevel gear 30, which meshes with the bevel pinion 4. The upper end of shaft 29 is provided with a bevel gear 31.

Arranged within and secured to the cylinder 23 above the support 24 is a frame 32 in which is mounted a lower shaft 33 formed with a bevel gear 34, which meshes with the gear 31. The shaft 33 is formed with a pinion 35, which meshes with a gear 36 carried by an intermediate shaft 37 supported by frame 32. The shaft 37 is provided with a pinion 38, which meshes with a gear 39 carried by an upper shaft 40 mounted in and extended in opposite directions from the frame 32. The shaft 40 has fixed to one end thereof an impulse member substantially in the form of a star wheel 41, which has four points and at its opposite end it has secured thereto a head 42, which carries an L-shaped shifting arm 43. Journaled in the frame 32 is a rock shaft 44 provided at one end with a crank arm 45 disposed in the path of arm 43 and at its other end has secured thereto an outwardly directed curved suspension bar 46, which is connected at its outer end to an element 47 forming the simulation of a portion of one arm and one hand of a shoemaker. The element 47 has secured thereto and extended therefrom a member 48 constituting the simulation of a shoemaker's hammer. That portion of shaft 44, which carries the bar 46 is extended into a sleeve simulation 49 of the part 18. The element 47 is arranged in and extended from the sleeve simulation 49. The member 48 has the head thereof arranged over the sole 14 of element 11. Supported from the top of frame 32 is a vertically disposed stationary pin 50 and encompassing the latter is an oscillatory sleeve 51, which has secured to its upper end a horizontally disposed circular carrier 52 arranged against the bottom of the part 19. The latter and carrier 52 are fixedly secured together by a channeled inwardly opening annulus 53. The carrier 52 is formed with a slot 54. The carrier 52 bodily oscillates with the sleeve 51, and which in turn bodily carries the parts 19, 20 therewith. There is correlated with the carrier 52 a depending rod 55 for shifting it against the action of a winding and unwinding controlling spring 56. The latter is wound about the sleeve 51, has one end secured to the latter and its other end extended and anchored to frame 32, as at 57.

The neck simulation part 19 is formed with a laterally extending flange 58, which is overlapped by the annulus 53. The latter also overlaps the carrier 52. The head simulation part 20 is formed with an opening 59 in which is arranged a grooved substantially triangular shaped member 60 forming the simulation of a lower jaw, which is arranged to project from and to extend into the part 20 through opening 59. The member 60 is mounted upon and shiftable on a horizontally disposed fulcrum 61 arranged within and supported by the part 20. The member 60 is spring controlled and for such purpose an elastic element 62 is attached to the inner end of said member 60 and to a hook 63 arranged in the part 20. The member 60 is rocked on its fulcrum in one direction, against the action of the element 62 by a depending angle-shaped pull rod 64 passing downwardly through slot 54 and having its lower end arranged in the path of the impulse member or star wheel 41 to be intermittently shifted by the latter.

The parts 19, 20 are bodily oscillated in unison and when oscillated the member 60 is also rocked to simulate the opening and closing of the lower jaw simulation of the simulation of the head. Simultaneously with the oscillating of the parts 19, 20 in unison, the element 47 is rocked for the purpose of the hammer simulating the driving of a tack, nail or peg 65 into the sole 14. The head and neck simulations are oscillated or turned and the hammer given an up and down motion by the correlation of the arm 43 with the rod 55 and the spring 57 with the sleeve 50 and the correlation of the arm 43 with the crank arm 45 on the shaft 44. The member 60 is given an opening and closing movement by the correlation of the pull rod 64, star wheel 41 and elastic element 62. The train of gearing which correlates with the shafts 33, 37, and 40 for operating such shafts is driven from the gear 31 on the operation of shaft 29, and when shafts 33, 37, 40 are driven they provide for the operation of the means for oscillating the head, the opening and closing of the lower jaw and the upward and downward motion of the hammer.

What I claim is:

1. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, and a common driving mechanism for the said pair of actuating elements.

2. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, a common driving mechanism for the said pair of actuating elements, and a vertical structure arranged outwardly of the said other structure and including the simulation of a shoemaker's stand, the simulation of a shoemaker's last mounted in said stand and the simulation of an inverted shoe mounted on said last arranged directly below the hammer simulation.

3. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, and a common driving mechanism for the said pair of actuating elements, one of the said independent means including a depending straight rod, another of the said independent means including an angle-shaped rod and the other one of the said independent means including a crank arm, said straight rod and crank arm being arranged in the path of one of said elements and said angle-shaped rod being arranged in the path of the other one of said elements.

4. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, a common driving mechanism for the said pair of actuating elements, and a vertical structure arranged outwardly of the said other structure and including the simulation of a shoemaker's stand, the simulation of a shoemaker's last mounted in said stand and the simulation of an inverted shoe mounted on said last arranged directly below the hammer simulation, one of the said independent means including a depending straight rod, another of the said independent means including an angle-shaped rod and the other one of the said independent means including a crank arm, said straight rod and crank arm being arranged in the path of one of said elements and said angle-shaped rod being arranged in the path of the other one of said elements.

5. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, a common driving mechanism for the said pair of actuating elements, one of the said independent means including a depending straight rod, another of the said independent means including an angle-shaped rod and the other one of the said independent means including a crank arm, said straight rod and crank arm being arranged in the path of one of said elements and said angle-shaped rod being arranged in the path of the other one of said elements, and said driving mechanism including a driven shaft provided at one end with one of said elements and the other end with the other of said elements.

6. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, a common driving mechanism for the said pair of actuating elements, a vertical structure arranged outwardly of the said other structure and including the simulation of a shoemaker's stand, the simulation of a shoemaker's last mounted in said stand and the simulation of an inverted shoe mounted on said last arranged directly below the hammer simulation, one of the said independent means including a depending straight rod, another of the said independent means including an angle-shaped rod and the other one of the said independent means including a crank arm, said straight rod and crank arm being arranged in the path of one of said elements and said angle-shaped rod being arranged in the path of the other one of said elements, and said driving mechanism including a driven shaft provided at one end with one of said elements and the other end with the other of said elements.

7. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, a common driving mechanism for the said pair of actuating elements, one of the said independent means including a depending straight rod, another of the said independent means including an angle-shaped rod and the other one of the said independent means including a crank arm, said straight rod and crank arm being arranged in the path of one of said elements and said angle-shaped rod being arranged in the path of the other one of said elements, and said driving mechanism including a driven shaft provided at one end with one of said elements and the other end with the other of said elements, one of said elements being in the form of an angle-shaped arm and the other being substantially in the form of a star-wheel.

8. In a mechanical display device including an upstanding structure simulating the appearance of a shoemaker repairing a shoe, said structure including an oscillatory spring controlled head simulating part having an opening, a rockable part arranged in said opening, fulcrumed in said other part and simulating a movable lower jaw for said head simulation and an upwardly and downwardly movable part extending outwardly with respect to said head simulation and simulating an arm of the simulation of the shoemaker provided with a hammer, independent means extended from said parts for operating them, a revoluble independent actuating element for one of said parts, a revoluble actuating element common to the others of said parts, a common driving mechanism for the said pair of actuating elements, a vertical structure arranged outwardly of the said other structure and including the simulation of a shoemaker's stand, the simulation of a shoemaker's last mounted in said stand and the simulation of an inverted shoe mounted on said last arranged directly below the hammer simulation, one of the said independent means including a depending straight rod, another of the said independent means including an angle-shaped rod and the other one of the said independent means including a crank arm, said straight rod and crank arm being arranged in the path of one of said elements and said angle-shaped rod being arranged in the path of the other one of said elements, and said driving mechanism including a driven shaft provided at one end with one of said elements and the other end with the other of said elements, one of said elements being in the form of an angle-shaped arm and the other being substantially in the form of a star-wheel.

PAUL E. JOLLY.